(12) United States Patent
Rose et al.

(10) Patent No.: US 10,556,475 B2
(45) Date of Patent: Feb. 11, 2020

(54) STOP DEVICE

(71) Applicant: Vibracoustic GmbH, Darmstadt (DE)

(72) Inventors: David Rose, Hamburg (DE); Philipp Werner, Lueneburg (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 1 day.

(21) Appl. No.: 15/740,815

(22) PCT Filed: Jun. 29, 2016

(86) PCT No.: PCT/EP2016/065118
§ 371 (c)(1),
(2) Date: Dec. 29, 2017

(87) PCT Pub. No.: WO2017/001462
PCT Pub. Date: Jan. 5, 2017

(65) Prior Publication Data
US 2018/0186204 A1 Jul. 5, 2018

(30) Foreign Application Priority Data

Jun. 30, 2015 (DE) .................. 10 2015 110 546

(51) Int. Cl.
*B60G 7/04* (2006.01)
*B60G 11/02* (2006.01)

(52) U.S. Cl.
CPC .............. *B60G 7/04* (2013.01); *B60G 11/02* (2013.01); *B60G 2202/11* (2013.01);
(Continued)

(58) Field of Classification Search
CPC ...... F16F 1/22; F16F 1/26; F16F 1/368; F16F 1/3686; F16F 1/3683; B60G 7/04;
(Continued)

(56) References Cited

U.S. PATENT DOCUMENTS 2,735,673 A * 2/1956 Muller ................... B60G 7/04
16/86 A
3,770,077 A 11/1973 Johnson
(Continued)

FOREIGN PATENT DOCUMENTS

DE 1012780 B 7/1957
DE 3515130 C2 9/1987
(Continued)

OTHER PUBLICATIONS

Dialog translation, JP 8033155 A, Feb. 1996. (Year: 1996).*

*Primary Examiner* — Thomas J Williams
(74) *Attorney, Agent, or Firm* — Leydig, Voit & Mayer, Ltd.

(57) ABSTRACT

In an embodiment, the present invention provides a stop device for limiting a vertical spring deflection of a motor vehicle leaf spring that is mounted on an axle member, the stop device including: a stop which limits a vertical movement of the leaf spring; a support structure for supporting and mounting the stop on a vehicle support; and a guiding device for receiving and guiding at least one of a cable, a line, and/or a holder. The guiding device is fastened to the support structure.

14 Claims, 2 Drawing Sheets

(52) U.S. Cl.
CPC .. *B60G 2204/201* (2013.01); *B60G 2204/202* (2013.01); *B60G 2204/4502* (2013.01); *B60G 2206/60* (2013.01); *B60G 2206/7101* (2013.01); *B60G 2206/7102* (2013.01)

(58) Field of Classification Search
CPC ................ B60G 11/02; B60G 2202/11; B60G 2204/121; B60G 2204/4502; B60G 2206/60
USPC ............................ 280/124.104; 180/311, 902
See application file for complete search history.

(56) References Cited

U.S. PATENT DOCUMENTS

| | | | | |
|---|---|---|---|---|
| 3,850,444 | A | * | 11/1974 | Wright ..................... B60G 7/04 267/259 |
| 6,371,466 | B1 | | 4/2002 | Spears |
| 7,214,879 | B1 | * | 5/2007 | Suzuki ................ B60R 16/0215 174/68.3 |
| 2012/0313339 | A1 | | 12/2012 | Heimann et al. |

FOREIGN PATENT DOCUMENTS

| | | | | |
|---|---|---|---|---|
| DE | 3620883 | C2 | | 3/1988 |
| DE | 102011077336 | A1 | | 12/2012 |
| EP | 1155884 | A2 | | 11/2001 |
| EP | 2933124 | A1 | | 10/2015 |
| JP | S 61282107 | A | | 12/1986 |
| JP | H 0516626 | A | | 1/1993 |
| JP | H 0517242 | U | | 3/1993 |
| JP | H 05270226 | A | | 10/1993 |
| JP | H 07257129 | A | | 10/1995 |
| JP | 08033155 | A | * | 2/1996 |
| JP | 2000255240 | A | | 9/2000 |
| JP | 2000270438 | A | * | 9/2000 |
| JP | 2009083705 | A | | 4/2009 |
| KR | 20030072895 | A | * | 9/2003 |

\* cited by examiner

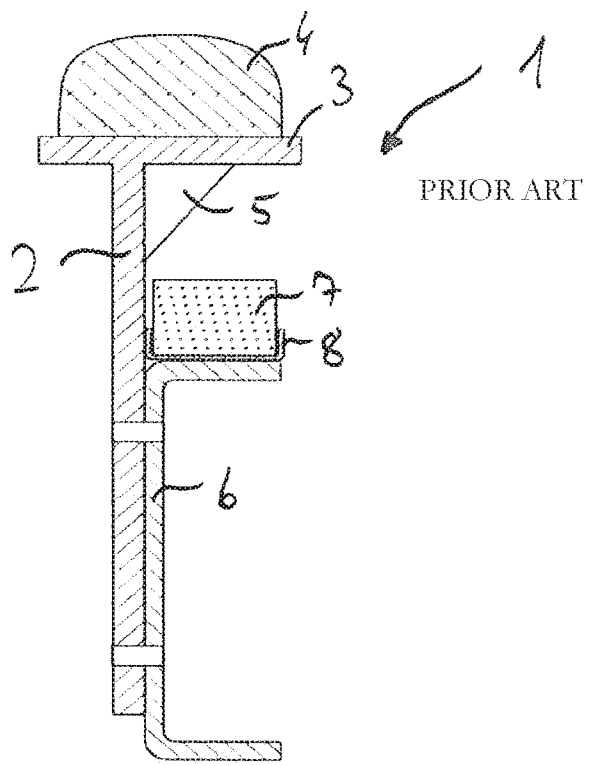
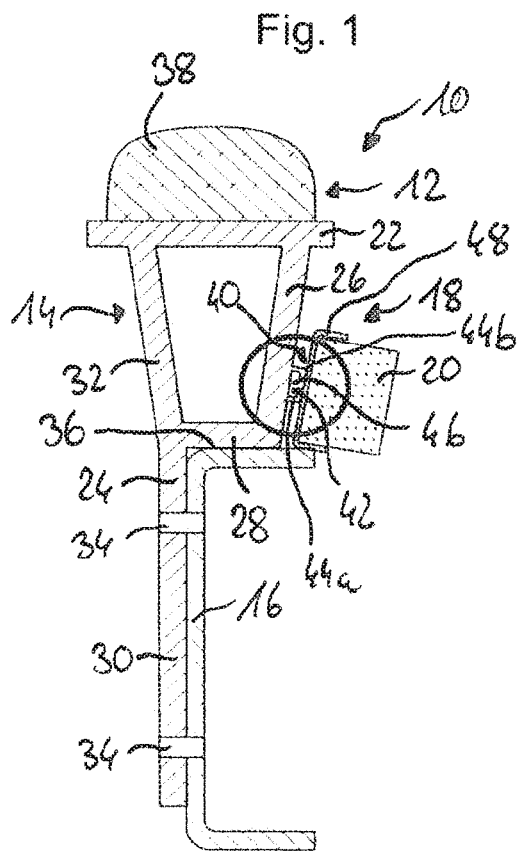
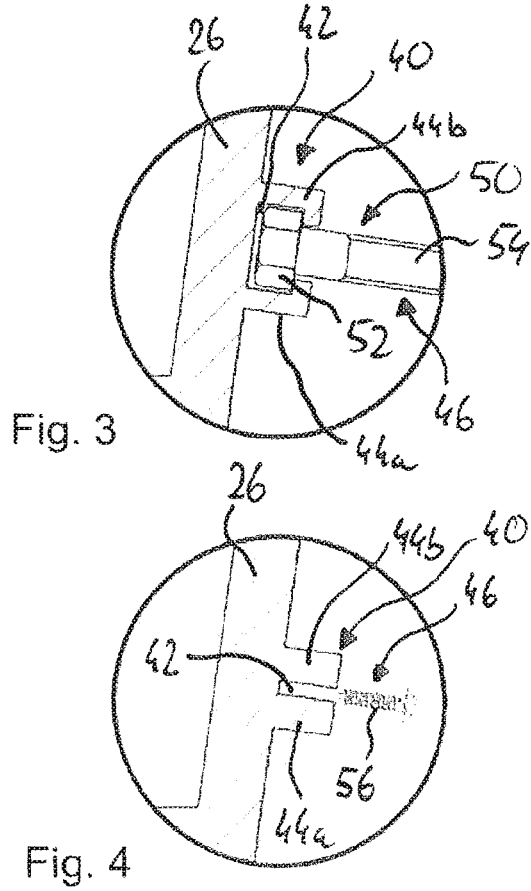
Fig. 1
Fig. 2
Fig. 3
Fig. 4

STOP DEVICE

CROSS-REFERENCE TO PRIOR APPLICATIONS

This application is a U.S. National Phase application under 35 U.S.C. § 371 of International Application No. PCT/EP2016/065118, filed on Jun. 29, 2016, and claims benefit to German Patent Application No. DE 10 2015 110 546.2, filed on Jun. 30, 2015. The International Application was published in German on Jan. 5, 2017 as WO 2017/001462 under PCT Article 21(2).

FIELD

The present invention relates to a stop device for limiting a vertical spring deflection of a motor vehicle leaf spring that is mounted on an axle member.

BACKGROUND

In motor vehicles, in particular in commercial vehicles, which have a leaf-sprung axle, there is the danger that when driving over bumps or during braking the axle is heavily deflected. This can lead to an overuse of the leaf spring. This overuse is due to an undefined, S-shaped deflection of the leaf spring. To avoid overuse of the leaf spring, a stop device of the aforementioned type is used. For this purpose it is known to mount the stop device on a vehicle support of the motor vehicle.

Thus, DE 35 15 130 C2 discloses a rubber stop, which is mounted on a vehicle support of a commercial vehicle via a retaining plate.

Furthermore, DE 36 20 883 C2 discloses a stop device which has a stop bracket formed from two solid steel sheets with a receiving opening into which a rubber stop is inserted. The stop bracket is secured to a vehicle support such that the rubber stop rests against the vehicle support and is fixed in the receiving opening.

Furthermore, JP 52 70 226 A discloses a stop device with a rubber stop which is attached to a support made of metal. The support is in turn bolted on a vehicle support.

Due to their construction, the stop devices known from the prior art have a high weight.

Furthermore, a known stop device 1 is shown in FIG. 1, which consists of a massive T-shaped steel support 2, which on the end side is provided with a support plate 3, on which a rubber buffer 4 is arranged. The support plate 3 is supported by ribs 5 on the steel support 2 to induce the forces acting on the rubber buffer 4 into the steel support 2. The steel support 2 is fastened via two screws on a vehicle support 6. As can be seen in FIG. 1, the installation space available on the vehicle support 6 is provided for cable lines 7. The cable lines 7 are pre-assembled in retaining plates 8 and secured by means of these retaining plates 8 on the vehicle support 6.

Due to the occurance of high bending moments this stop device requires a heavy steel structure for mounting the rubber buffer on a longitudinal vehicle support. As a result of this, this known stop device has a high weight so that motor vehicle provided with it has a low payload and high $CO_2$ emissions. In addition, the steel support is made by forging, which requires a subsequent machining of the steel support. Subsequent machining is cost-intensive. In addition, the installation space on the longitudinal vehicle support 6 is used without restriction for cable lines.

SUMMARY

In an embodiment, the present invention provides a stop device for limiting a vertical spring deflection of a motor vehicle leaf spring that is mounted on an axle member, the stop device comprising: a stop which limits a vertical movement of the leaf spring; a support structure configured to support and mount the stop on a vehicle support; and a guiding device configured to receive and guide at least one of a cable, a line, and/or a holder, wherein the guiding device is fastened to the support structure.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows a cross section through a known stop device;

FIG. 2 shows a cross section through a stop device according to a first embodiment;

FIG. 3 shows an enlarged view of the fastening device showed in FIG. 3 with an insertion member formed as a hexagon screw;

FIG. 4 shows an enlarged view of another embodiment of a fastening device with an insertion member formed as a screw;

DETAILED DESCRIPTION

Figure 5:
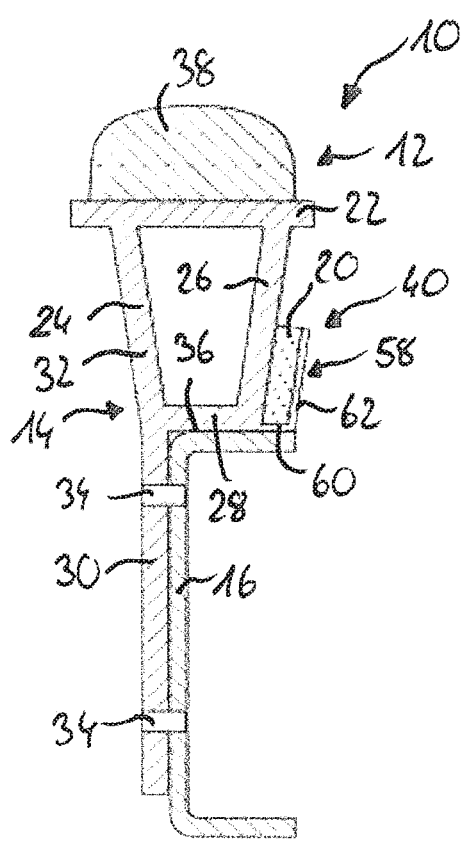
FIG. 5 shows a cross section through a stop device according to the second embodiment.

In the context of the present invention, the leaf-sprung axle may have at least one of leaf spring or a spring packet formed from a plurality of leaf springs.

According to one aspect of the invention, a stop device is proposed for limiting vertical spring deflection of a motor vehicle leaf spring fastened to an axle member. The stop device comprises a stop which limits the vertical movement of the leaf-sprung axle, a support structure for supporting and mounting the stop on a vehicle support, and a guiding device for receiving and guiding at least one of a cable, a line and/or a holder, wherein the guiding device is fastened to the support. By mounting the guiding device to the support structure, the installation space for the cables, various lines, such as air lines, break lines, hydraulic lines and/or their retaining plates is relocated, so that additional installation space is created. This additional installation space may now be used to absorb the bending moment acting on the support structure and to support the stop torque-free on the longitudinal vehicle support. As a result, a heavy steel construction may be replaced by a lighter and less expensive support structure. Thus, the support structure may be designed as an extruded aluminum profile, which is optionally subsequently machined. An extruded aluminum profile with subsequent machining is more cost-effective compared to a forged steel support, which has been subsequently machined. Due to the use of a lighter material for the support structure, the stop device has a lower weight, thereby increasing the payload of the motor vehicle and reducing the $CO_2$ emissions. The guiding device may be formed from a retaining plate which accommodates at least one of a cable and/or a line or a cable package and/or a line package formed from a plurality of cables and/or lines. Furthermore, the cable and/or the line or the cable package and/or the line package may be coated with a protective sheath made of sheet metal or plastic.

Advantageously, the guiding device is connected to the support structure in such a way that it is arranged laterally on the support structure.

In an advantageous embodiment, the support structure is formed such that a portion of the support structure is supported on the vehicle support. Thereby, the force acting on the stop may be absorbed by uniformly inducing the force into the vehicle support via the support structure. As a result, the impact is supported torque-free.

The support structure may include a support plate on which the stop is disposed, a first support, a second support, and a cross beam interconnecting the two supports. Advantageously, the second support is supported on the vehicle support. Further preferably, the support plate is arranged on the two supports. The cross beam may rest on the vehicle support. The two supports support the stop arranged on the support plate torque-free on the vehicle support. In particular, the second support, being integrally formed with the support structure and directly supported on the vehicle support, absorbs the bending moment acting on the stop and/or the first support. In the context of the invention, the first support may also be referred to as a stand bar. Preferably, the support plate, the support and the cross beam are joined together in a bonded and/or integrally connected manner.

In an advantageous embodiment, the two supports have conical form in a portion. As a result, an improved support of the stop and an improved absorption of the force acting on the stop is possible. Preferably, the conical shape of the two supports is designed such that the conical opening increases in the direction of the support plate.

In an advantageous embodiment, the support structure has a fastening device for fastening, preferably for releasable fastening, of the guiding device on a support structure. Fastening of the guiding device on the support structure takes place via the fastening device. The fastening device is advantageously arranged laterally on the support structure, in particular laterally on one of the supports.

The fastening device may be designed as an insertion shaft into which an insertion member connected or connectable with the guiding device may be inserted. The insertion shaft integrally formed with the support structure may have two cheeks forming a groove and/or a longitudinal opening, for instance. Preferably, the insertion shaft extends in the depth direction of the support structure. Further preferably, the insertion shaft extends in the depth direction over the entire length of the support structure. An insertion member projecting from the guiding device may be insterted into the insertion shaft. The insertion member preferably serves thereby as a fastening device. The insertion member may be joined with the guiding device in a bonded and/or force-fitting manner. Preferably, the insertion member projecting from the guiding device has a shape corresponding to the insertion shaft, so that the insertion member may be inserted into the insertion shaft in a form-fitting manner. Thus, for example, a hexagon screw may be used as an insertion member, whose head may be inserted into the insertion shaft in a torsion-resistant manner. In a very narrow design of the insertion shaft, for example, a self-tapping screw may be screwed into the guiding device for fastening the guiding device. Furthermore, the insertion shaft may also be provided with undercuts. As a result, the guiding device may be fastened to the insertion shaft by means of a clip connection. Through the undercuts, at least one clip member may interlock in the insertion shaft. The cheeks of the insertion shaft may protrude from the support structure, preferably material-uniformly joined. Furthermore, the insertion shaft may be introduced into the support structure.

In an advantageous embodiment, the fastening device may be formed as at least one opening introduced into the support structure. A fastening member, such as a clip, a cable binder or a pipe clamp, is passed through the opening to mount the guiding device laterally on the support structure, in particular on the second support. Advantageously, a plurality of openings may be introduced into the support structure. The openings may be introduced by a subsequent machining of the support structure.

Further advantageously, the guiding device is formed as an insertion compartment joined with the support structure in a bonded, preferably material-uniform manner. At least one cable and/or one line, a plurality of cables and/or lines and/or a cable package and/or line package formed from a plurality of cables and/or lines may be inserted into the insertion compartment. In an advantageous embodiment, the cable and/or the line, the cables and/or the lines and/or the cable package and/or the line package have previously been encased with a protective sheath made of sheet metal or plastic and/or pre-assembled, in order to prevent abrasion, for instance, on the sharp sawed edges of the support and/or the insertion compartment. The cable or cables pre-assembled with a cable guide are then inserted into the insertion compartment. In an advantageous embodiment, the insertion compartment is laterally joined with the support structure, in particular with the second support, in a bonded manner. Further advantageously, the insertion compartment is joined with the support structure such that the insertion compartment rests on the vehicle support.

The insertion compartment may have an undercut in the region of an insertion opening. The undercut prevents slipping out of the inserted cable(s) and/or the inserted line(s), respectively the cable(s) and/or line(s) pre-assembled with a guide, from the insertion compartment. Advantageously, the undercut is formed as a projection protruding from a wall of the insertion compartment into the insertion opening.

In an advantageous embodiment, the support structure is formed by means of extrusion molding, extrusion or injection molding. The support structure is preferably formed as an extruded aluminum profile. A support structure formed as an extruded aluminum profile with a potential subsequent machining is inexpensive to manufacture.

Further advantageously, the support structure is formed of a metal, in particular a light metal, or a fiber-reinforced plastic. Advantageously, the support structure is made of aluminum. By using a light metal or a fiber-reinforced plastic, the stop device has a low weight, so that the payload of the motor vehicle increases and the $CO_2$ emissions are reduced. In particular, compared to a steel construction, a support structure made of aluminum has a weight reduced by half while maintaining its function.

In an advantageous embodiment, the stop is formed of an elastomeric material as a buffer which is arranged on the support plate. A buffer formed of an elastomeric material has good damping characteristics. The stop may be joined with the support plate in a bonded and/or force-fitting manner.

The support structure may be connected to the vehicle support. Advantageously, the support structure is bolted to the vehicle support. For this purpose, the support structure, in particular the first support, may be provided with openings, through which the screws are passed and screwed into openings which formed on the vehicle support. Further, the support structure may also be connected to the vehicle support in a different manner. For example, the support structure may be riveted and/or welded to the vehicle support.

In FIG. 2, a stop device 10 is shown according to a first embodiment, which serves to limit a vertical spring deflection of a leaf spring mounted on an axle member.

The stop device 10 has a stop 12, a support structure 14 for supporting and mounting the stop 12 on a vehicle support 16 and a guiding device 18 for receiving and guiding a pre-assembled cable package and/or a pre-assembled line package 20.

The support structure 14 is made as an extruded profile of a light metal, in particular aluminum. The support structure 14 has a support plate 22, a first support 24, a second support 26, and a cross beam 28 interconnecting the two supports 24, 26.

The first support 24 has a first portion 30 and an approximately conically extending second portion 32. The first portion 30 serves for mounting the stop device 10 on the vehicle support 16. For this purpose, the first portion 32 has mounting openings 34 into which mounting members, in particular screws, may be inserted into openings corresponding to the vehicle support 16. The second support 26 is supported on an upper side 36 of the vehicle support 16. The cross beam 28 interconnecting the two supports 24, 26 rests on an upper side 36 of the vehicle support 16. The first portion 30 of the first support 24 and the second support 26 are approximately conical to each other and are connected to the support plate 22.

The stop 12 is arranged on the support plate 22. The stop 12 is formed as a buffer 38 made of an elastomeric material. The buffer 38 is presently joined to the support plate 22 in a bonded manner. The buffer 38 may also be joined to the support plate 22 via a screw connection, for example.

Since the second support 26 is supported on the upper side 36 of the vehicle support 16, the bending moment acting on the first support when striking a leaf spring is absorbed, so that the support plate 22 which serves as a substrate for the buffer 38 is supported torque-free.

In order to create the installation space required for the second support 26 and the cross beam 28, the second support 26 is provided with a fastening device 40, which in the present case is arranged laterally on the second support 26. The fastening device 40 is formed according to FIG. 2 as an insertion shaft 42, which is formed from two cheeks 44a, 44b. The cheeks 44a, 44b form a groove into which an insertion member 46 may be inserted, wherein the cheeks 44a, 44b have an approximately L-shaped profile in cross section.

As can be seen in FIG. 2, the guiding device 18 has a retaining plate 48, into which the cable package and/or the line package 20 is inserted. The retaining plate 48 is connected to the insertion member 46, which serves as a mounting member. The insertion member 46 may be joined to the retaining plate 48 in a force-fitting and/or bonded manner. In order to mount the retaining plate 48 on the second support 26, the insertion member 46 is inserted, especially slid into the insertion shaft 42.

In an embodiment shown in FIG. 3, the insertion member 46 is formed as a hexagonal screw 50, whose head 52 is inserted into the insertion shaft 42 and whose thread 54 may be connected to the retaining plate 46. For the purpose of fastening of the retaining plate 48 on the support 26, one or more hexagon screws 50 or similar shapes which permit torsional resistance may be used.

In the further embodiment of the fastening device 40 shown in FIG. 4 the cheeks 44a, 44b are formed as two closely spaced thick ribs, which form a groove, into whose narrow gap a self-tapping screw 56 may be screwed for fastening the retaining plate 48.

Furthermore, it is also conceivable to mount the guiding device 16 by means of a clip connection to the insertion shaft 42, in which clips hook into an undercut formed by the cheeks 44a, 44b. In addition, it is also conceivable to introduce holes into the support structure 14, through which cable binders, clips or pipe clamps may be passed, in ordert to mount the guiding device 18 on the support structure 14.

In FIG. 5, a second embodiment of a stop device 10 is shown, which differs from the first embodiment in that the guiding device 16 is formed as an insertion compartment 58 arranged laterally on the second support 26, whereby the insertion compartment 58 is joined to the second support 26 in a bonded and materially uniform manner. The insertion compartment 58 has a bottom 60, and a side wall 62 which is approximately parallel to the second support 26. A pre-assembled cable package and/or a pre-assembled line package 20 is/are inserted into the insertion compartment 56. The cable package and/or line package 20 may be encased with a protective sheath made of sheet metal or plastic, in order to prevent abrasion, for instance, on the sharp sawed edges of the support structure 14.

Figure 6:
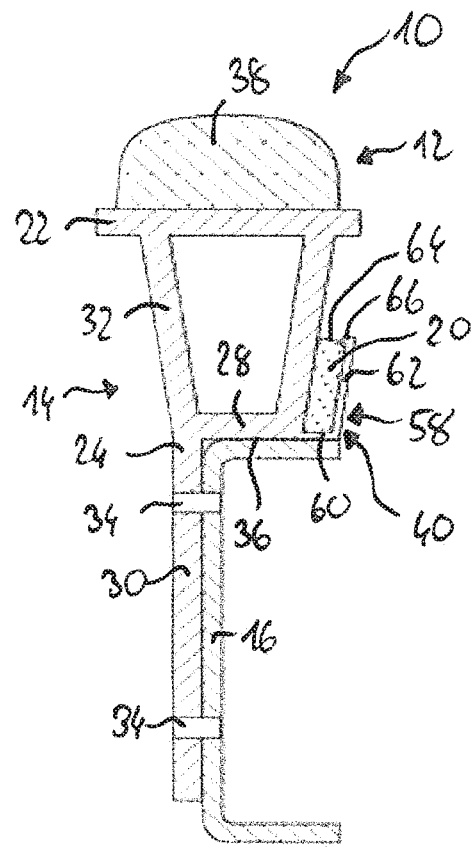
FIG. 6 shows a cross section through a stop device according to a third embodiment.

In FIG. 6, a third embodiment of a stop device 10 is disclosed, which particularly differs from the second embodiment in that the insertion compartment 58 has a projection 66 protruding from the side wall 62 in the region of an insertion opening 64. The projection 64 serves as an undercut to prevent slipping out of the cable package and or a line package 20 in the direction of the insertion opening 64.

By relocating the attachment of the guiding device 18 to the support structure 12, additional installation space is created on the vehicle support 16. This additional installation space may be used to integrate a second support 26 into the support structure 14, whereby the second support 26 is supported on the upper side 36 of the vehicle support 16. The second support 26 absorbs a bending moment acting on the first support 24 and thereby supports the support plate 22 torque-free. This makes it possible to form the support structure 14 as a lightweight, low-cost extruded aluminum profile, thereby increasing the payload of a motor vehicle and reducing CO2 emissions.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 stop device
2 steel support
3 substrate plate
4 rubber buffers
5 rib
6 longitudinal vehicle support
7 cable lines
8 retaining plate
10 stop device
12 stop
14 support structure
16 vehicle support
18 guiding device
20 cable package and/or line package
22 support plate
24 first support
26 second support
28 cross beam
30 first portion
32 second portion
34 mounting opening
36 upper side
38 buffer
40 fastening device
42 insertion shaft
44a cheek
44b cheek
46 insertion member
48 retaining plate
50 hexagon screw
52 head
54 thread
56 self-tapping screw
58 insertion compartment
60 bottom
62 side wall
64 insertion opening
66 projection

The invention claimed is:

1. A stop device for limiting a vertical spring deflection of a motor vehicle leaf spring that is mounted on an axle member, the stop device comprising:

a stop which limits a vertical movement of the leaf spring;
a support structure configured to support and mount the stop on a vehicle support; and
a guiding device configured to receive and guide at least one of a cable, a line, and/or a holder,
wherein the guiding device is fastened to the support structure, the support structure having a support plate on which the stop is arranged, a first support, a second support, which support the support plate, and a cross beam connecting the two supports with each other,
wherein the support structure is a formed as an integral single piece, and
wherein the cross beam is on a lateral extent of the vehicle support and the first support extends adjacent to a vertical extent of the vehicle support.

2. The stop device according to claim 1, wherein the support structure is formed such that a portion of the support structure is supported on the vehicle support.

3. The stop device according to claim 1, wherein a bottommost end of the stop is attached to a front face of the support plate.

4. The stop device according to claim 1, wherein both of the supports are conical to each other in one portion.

5. The stop device according to claim 1, wherein the support structure has a fastening device configured to fasten the guiding device.

6. The stop device according to claim 5, wherein the fastening device comprises an insertion shaft, into which an insertable member which is or may be connected to the guiding device may be inserted.

7. The stop device according to claim 5, wherein the fastening device comprises at least one opening introduced into the support structure.

8. The stop device according to claim 1, wherein the guiding device comprises an insertion compartment connected to the support structure.

9. The stop device according to claim 8, wherein the insertion compartment has an undercut in a region of an insertion opening.

10. The stop device according to claim 1, wherein the support structure comprises an extrusion molding, an extrusion, or an injection molding.

11. The stop device according to claim 1, wherein the support structure comprises a metal or a fiber reinforced plastic.

12. The stop device according to claim 1, wherein the stop comprises a buffer of an elastomeric material which is arranged on the support plate.

13. The stop device according to claim 1, wherein the support structure is connected to the vehicle support.

14. The stop device according to claim 13, wherein the support plate is spaced apart from the cross beam, and internally facing sides of each of the first support, the second support, the support plate, and the cross beam define an interior space of the support structure.

* * * * *